US008699199B2

(12) United States Patent
Blakes

(10) Patent No.: US 8,699,199 B2
(45) Date of Patent: Apr. 15, 2014

(54) PORTABLE MAGNET POWER SUPPLY FOR A SUPERCONDUCTING MAGNET AND A METHOD FOR REMOVING ENERGY FROM A SUPERCONDUCTING MAGNET USING A PORTABLE MAGNET POWER SUPPLY

(75) Inventor: Hugh Alexander Blakes, Oxfordshire (GB)

(73) Assignee: Siemens Plc., Frimley, Camberley (GB)

( * ) Notice: Subject to any disclaimer, the term of this patent is extended or adjusted under 35 U.S.C. 154(b) by 491 days.

(21) Appl. No.: 12/828,717

(22) Filed: Jul. 1, 2010

(65) Prior Publication Data

US 2011/0007445 A1   Jan. 13, 2011

(30) Foreign Application Priority Data

Jul. 9, 2009 (GB) .................................. 0911943.9

(51) Int. Cl.
*H01H 47/00* (2006.01)
(52) U.S. Cl.
USPC ........................................................ 361/141
(58) Field of Classification Search
USPC ........................................................ 361/141
See application file for complete search history.

(56) References Cited

U.S. PATENT DOCUMENTS

| 4,265,845 A | 5/1981 | Eschner |
| 4,286,141 A * | 8/1981 | MacCracken ................. 392/346 |
| 5,848,532 A | 12/1998 | Gamble et al. |
| 6,239,502 B1 * | 5/2001 | Grewe et al. .................. 290/1 B |
| 2002/0020174 A1 | 2/2002 | Kruip |
| 2003/0202306 A1 * | 10/2003 | Dubhashi ..................... 361/93.8 |
| 2004/0069454 A1 | 4/2004 | Bonsignore et al. |
| 2005/0068701 A1 | 3/2005 | Lee et al. |
| 2006/0088271 A1 | 4/2006 | Ghoshal |
| 2009/0154113 A1 * | 6/2009 | MacDonald .................. 361/720 |
| 2010/0284120 A1 * | 11/2010 | Beier ............................. 361/141 |

FOREIGN PATENT DOCUMENTS

JP    58097806 A    10/1983

OTHER PUBLICATIONS

"Analysis and Calculations of Energy-Removal Non-Linear Resistance for Superconducting Magnet Protections," Shang et al., Low Temperature Physics, vol. 3, No. 1 (1981), pp. 70-78.

* cited by examiner

*Primary Examiner* — Scott Bauer
(74) *Attorney, Agent, or Firm* — Schiff Hardin LLP

(57) ABSTRACT

A portable magnet power supply for a superconducting magnet includes apparatus for the storage of energy released from a superconducting magnet, the apparatus having an electrical run-down load for connection across the electrical terminals of a superconducting magnet; and a heat storage material in thermal contact with the run-down load; and a method for use thereof.

10 Claims, 2 Drawing Sheets

PORTABLE MAGNET POWER SUPPLY FOR A SUPERCONDUCTING MAGNET AND A METHOD FOR REMOVING ENERGY FROM A SUPERCONDUCTING MAGNET USING A PORTABLE MAGNET POWER SUPPLY

BACKGROUND OF THE INVENTION

1. Field of the Invention

The present invention relates to a portable magnet power supply for a superconducting magnet comprising apparatus for the storage of energy released from a superconducting magnet, useful in the controlled management of rundown energy released from superconducting magnets. In particular, it relates to apparatus for the storage of such energy within the portable magnet power supply for later dissipation.

2. Description of the Prior Art

Superconducting magnets are well known, and find application in Magnetic Resonance Imaging (MRI) systems, particle accelerators, Nuclear Magnetic Resonance (NMR) spectroscopy, energy storage and other applications. In use, an electric current flows essentially losslessly in a closed superconducting circuit. It is required to remove the current from superconducting magnets at certain times, for instance to enable service operations. Such intentional removal of current is known as ramping down.

FIG. 1 shows a schematic approximate equivalent circuit for a superconducting magnet. Within a cryogenic enclosure 10, at least one coil 12 of superconducting wire is provided, with accessible electrical connections 14, 16. In parallel with the coil(s) 12 is a superconducting switch 18. The superconducting switch comprises a length of superconductive wire, typically sheathed in a resistive metal outer 18b. A protection diode, or combination of diodes, 18c is typically connected across the switch. A small heater 18d is provided in thermal contact with the superconducting wire 18a. When required, an electric current is passed through the heater 18d, which heats the superconducting wire sufficiently to cause it to quench, becoming resistive. Electric current through the switch 18 must then pass through the resistive sheathing or through the quenched superconductor.

Conventionally, ramping down proceeds by connecting a portable magnet power supply across terminals of the magnet, and opening a superconducting switch within the magnet to cause the magnet current to flow through the magnet power supply. Typically, within the magnet power supply is provided a very high power diode arrangement, which causes a voltage drop within the magnet current path. This voltage drop, in combination with the magnet current flowing through it, leads to dissipation of energy as heat. This heat is carried from the diode to a heat sink provided within the magnet power supply for the purpose. As heat is dissipated in the diode, the heat sink is warmed, and dissipates heat to ambient, mainly by convection, but also by radiation and conduction. The heat sink must be large and massive, in order to dissipate heat at the rate that it is produced by the diode. This conventional arrangement requires a large, heavy-diode-and-heat-sink arrangement to ensure that is does not overheat when dissipating the energy stored in a superconducting magnet. In a typical current example, a 1.5 T superconducting magnet may store 4 MJ of energy, with the magnet power supply being designed to dissipate this energy in about 30 minutes. This represents an average dissipation power of 2.2 kW, but a peak dissipation power much higher. The energy of a 3 T magnet may take three times as long, using the same run-down load. In some known magnet power supplies, the diode is replaced by a resistor.

FIG. 2 schematically illustrates an approximate equivalent circuit of a conventional portable magnet power supply 20. The power supply 20 has externally accessible connections 24, 26 for connection to the connections 14, 16 of the magnet 10. A power converter 22 receives 3-phase mains power 24 and converts this into a low-voltage, high current DC output. A run-down load 28 is provided, in thermal contact with a large heat sink 30. The heat sink 30 is typically a metal block, and is usually provided with fins 32 and a fan 34 to aid cooling. A mode switch 36 allows a user to switch between a ramping mode, in which the power converter 22 is connected across the magnet 10, and a run down mode, in which the run-down load 28 is connected across the magnet.

Known portable magnet power supplies are large and heavy, typically weighing about 85 kg. Service technicians transport these power supplies around the world to service superconducting-magnet-containing systems such as MRI systems. It is desired to reduce the size and weight of such power supplies. It is important to minimize the size and weight of the magnet power supply, as transportation costs represent a large portion of the costs of a service call.

Arrangements for temperature stabilization using phase-change materials are described in United States patent application 2002/0020174 and Japanese patent application JP60189021. Further discussion of such applications may be found in "Thermal Management Using "Dry" Phase Change Materials", Proc. Fifteenth IEEE Semiconductor Thermal Measurement and Management Symposium, Mar. 9-11, 1999, San Diego Calif. pp 74-82 IEEE No. 99CH36306.

SUMMARY OF THE INVENTION

The present invention is not concerned with temperature stabilization, but with heat storage and dissipation.

The present invention accordingly provides portable magnet power supplies for superconducting magnets, including apparatus for the storage of energy released from a superconducting magnet, and methods and apparatus for removal of stored energy from superconducting magnets.

In accordance with the invention, a portable power supply for a superconducting magnet includes apparatus for the storage of energy released from a superconducting magnet, the apparatus including an electrical run-down load for connection across the electrical terminals of the superconducting magnet, and a heat storage material in thermal contact with the run-down load.

Also in accordance with the present invention, a method for removing energy from a superconducting magnet using a portable magnet power supply includes the step of connecting a run-down load of the portable magnet power supply across electrical terminals of the superconducting magnet, opening a superconducting switch to divert current flowing in the superconducting magnet through the run-down load, storing the heat generated by the run-down load in response to the current flowing there through in heat storage material of the portable power supply, and allowing the heat storage material to cool after the current has ceased to flow through the run-down load.

DESCRIPTION OF THE PREFERRED EMBODIMENTS

In current portable magnet power supplies, the largest and heaviest part of the magnet power supply is the arrangement for removing and dissipating the energy from the magnet. This arrangement, termed the run-down load, typically comprises a large metal heatsink, cooling fans and resistive and/or semiconductor circuit elements such as diodes. The rate of removal of the energy from the magnet is determined by the rate at which the load can dissipate heat to ambient.

It is desirable to extract the energy from the magnet in as short a time as possible as several ramps may be required to perform service operations such as shim iterations. Conventionally, the rate at which the energy can be extracted is directly proportional to the rate at which the run-down load can dissipate the heat to the ambient via a heatsink and fans, as conventionally the magnet power supply has been arranged to dissipate heat at approximately the rate at which it is generated within the run-down load.

Water cooling has been applied to some magnet power supplies, and this has been found to shrink the necessary size of the run-down load and heatsink. However, the necessary attachment of pipes, the possibility of water spillage and reliability issues make this approach undesirable.

The present invention provides a portable magnet power supply for a superconducting magnet featuring an improved run-down load arrangement which allows the run down energy to be extracted at the customary speed, or faster, but with much reduced size and weight of power supply components such as heatsinks and fans. The present invention also provides a corresponding method for removing energy from a superconducting magnet.

In particular, the present invention provides a portable magnet power supply for a superconducting magnet featuring a run-down load which does not dissipate heat at approximately the rate it is generated by the run-down load, but stores the majority of the generated heat for later dissipation. In a typical run down scenario, it is desired to run the magnet down as fast as possible. Service operations are then undertaken, and current re-introduced into the magnet in a process known as ramping. Run down may be required again, but there is commonly several hours between one ramp down operation and the next.

According to a feature of the present invention, the heat energy generated during ramping down is substantially stored within a heat storage material, and is dissipated over a period of time extending substantially beyond the end of the ramp down procedure, when electric current through the run-down load ceases.

Figure 1:
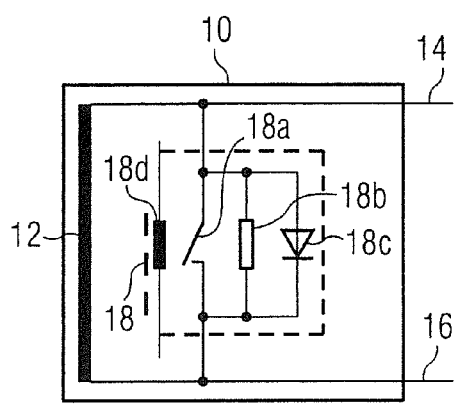
FIG. 1 shows an approximate equivalent circuit of a superconducting magnet.
Figure 2:
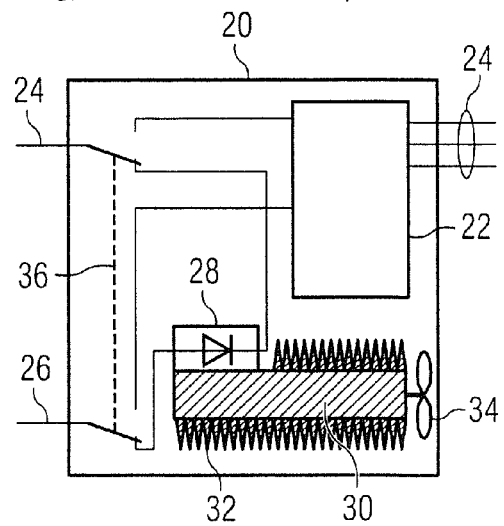
FIG. 2 shows an approximate equivalent circuit of a conventional magnet power supply.
Figure 3:
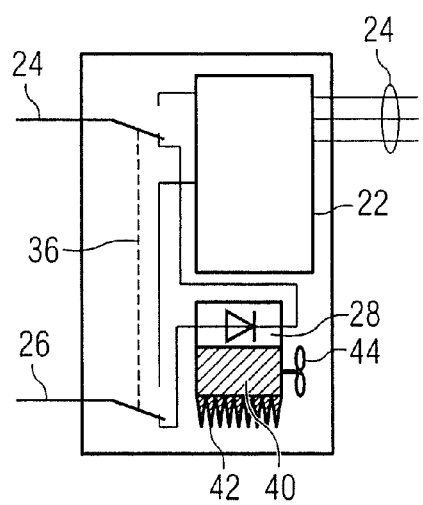
FIG. 3 shows an approximate equivalent circuit of a portable magnet power supply according to the present invention.

FIG. 3 schematically illustrates a portable magnet power supply according to an embodiment of the present invention. Features corresponding to features shown in FIG. 2 carry corresponding reference numerals. The magnet power supply of FIG. 3 differs from that of FIG. 2 in that the heat sink 30 is replaced with a heat storage material 40 in thermal contact with the run-down load 28. The heat storage material may be provided with fins 42 and/or a cooling fan, but these will typically be significantly smaller than those 32, 34 provided in the conventional magnet power supply of FIG. 2.

In an embodiment of the present invention, use is made of the thermal properties of solid to liquid phase-change of materials to store rundown energy and then release it slowly after the magnet has been run down. Instead of trying to dissipate the energy as fast as it is being extracted from the magnet, the energy is stored thermally in the chemical bonds of the phase change material.

In an embodiment, a suitable quantity of a heat storage material, such as a paraffin wax, which undergoes a solid-liquid phase change at an appropriate temperature, is held in thermal contact with the run-down load: the electrical component that is dissipating the energy; optionally also a small heatsink; and, optionally, also a small fan.

Figure 4:
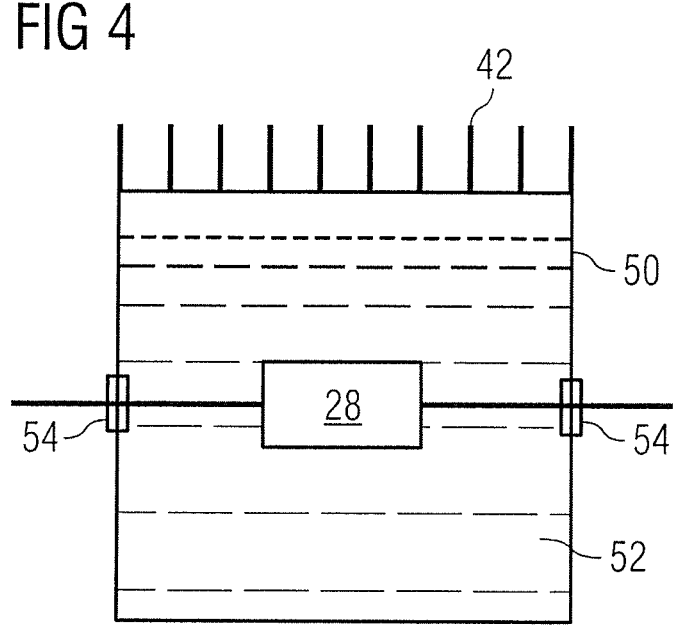
FIG. 4 shows a schematic diagram of a run-down load according to a feature of an embodiment of the present invention.

FIG. 4 schematically illustrates a run-down load and heat storage arrangement according to an embodiment of the present invention. The run-down load 28 is in thermal contact with a quantity of phase-change material 52. The run-down load 28 may be encased in a metal housing to assist in heat transfer to the phase change material. The metal housing may be finned to further assist in heat transfer to the phase change material. The phase change material is housed within a receptacle 50, capable of containing the phase change material in its liquid state, regardless of orientation. The receptacle should be of a thermally conductive material and may be provided with fins 42 to assist with heat transfer from the phase change material to ambient. Seals 54 may be required to allow electrical conductors to pass into the receptacle. The run-down load 28 will typically comprise a number of diodes.

In other embodiments, the run-down load 28 may be attached to the outside of a thermally conductive receptacle containing the phase change material. Although thermal contact between the run-down load and the phase change material may be reduced, there is no need to provide seals 54 or to pass electrical conductors through walls of the receptacle.

It has been found that the mass and volume of phase change material 52 such as paraffin wax required to absorb sufficient heat to allow run down of the magnet in a time similar to that of present arrangements allows a significantly smaller and lighter magnet power supply to be produced. For example, paraffin wax may store 400 J.cm$^{-3}$ in its phase transition. The 4 MJ energy discussed earlier as a typical energy stored in a 1.5 T superconducting magnet may therefore be stored in the phase change energy of 10 liters of such paraffin wax, weighing under 10 kg. The size and weight of such a heat storage material compares most favourably with the size and weight of conventional metallic heatsinks used for the purpose.

This arrangement reduces the size and weight of the components without slowing the ramp down time. The energy released by the run-down load is substantially stored in the phase change material, and is dissipated slowly. This dissipation may be aided by the addition of a relatively small heat sink and/or a relatively small fan.

Paraffin wax is thought to be suitable as the phase change material as it has a very high thermal capacity whilst being cheap, light and non-toxic. Micro-encapsulated paraffin wax may be used, and may require simpler retention arrangements in its liquid phase. The described method of storing thermal energy when applied to MRI magnet power supplies will allow much smaller and lighter magnet power supplies and allow big reductions in annual expenditure on transportation.

It alternative embodiments, heat generated by the run-down load may be stored in solid heat storage material, preferably a solid material having a high specific heat capacity. Ceramic bricks, such as those used in electric night storage heaters may be suitable. Resistive wire elements may be more appropriate as the run-down load in such embodiments, rather than the diodes conventionally used as a run-down load.

Figure 5:
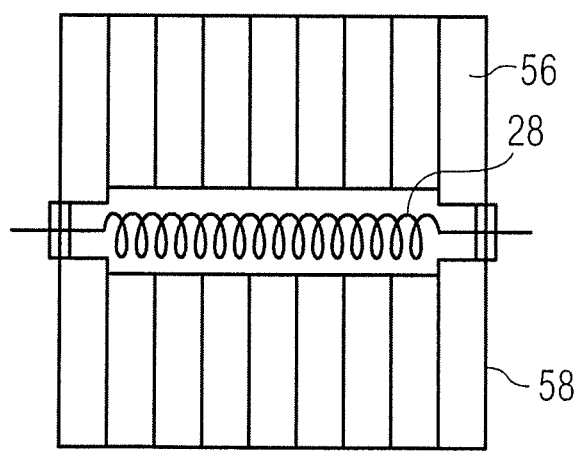
FIG. 5 shows a schematic diagram of a run-down load according to a feature of another embodiment of the present invention.

FIG. 5 schematically illustrates a run-down load and heat storage arrangement according to a second embodiment of the present invention. In this embodiment, a number of ceramic bricks 56 are arranged around, and in thermal contact with, a run-down load 28. In the illustrated embodiment, the run-down load is a resistive element, such as a coil of resistive wire. The run-down load may alternatively comprise a number of diodes in a suitably robust housing. The ceramic bricks may be retained within a receptacle 58, or otherwise constrained. Cooling fins may be provided to assist with heat transfer from the bricks to ambient. The run-down load may be placed on the outside of the receptacle, instead of being positioned between the bricks.

Although such solid heat storage materials do not have the advantage of storing energy in a phase change, there is no issue with constraining a liquid heat storage material. In such embodiments, the run-down load is simply located in thermal contact with the solid heat storage material. A heat sink, and/or a cooling fan, of modest size, may be provided to assist with heat dissipation, but the heat generated by the run-down load is substantially stored in the solid heat storage material.

When run down of the superconducting magnet is required, the magnet power supply is connected across the terminals of the magnet, and the magnet power supply is set to 'run down' mode. The superconducting switch within the magnet is opened, and the magnet current passes through a run-down load within the magnet power supply. This may be a number of diodes attached to a metal heatsink containing heat storage material, such as a phase change material or a solid heat storage material as discussed above. Alternatively, the run-down load may be a resistive element, such as a coil of resistive wire.

The voltage drop created by the magnet current flowing through the run-down load determines the rate at which energy is dissipated in the load, and so determines the rate at which the magnet is run down, and the time taken to run down completely. This dissipated thermal energy passes into the heat storage material, causing its temperature to increase.

In the case of a phase-change heat storage material, when the material reaches its melting point it undergoes a solid to liquid phase change which absorbs considerable amounts of energy without its temperature increasing. The amount of energy stored in this way is many times greater than the thermal mass of an equal mass of normal metallic material, such as a conventional heat sink. After this phase change is complete, the temperature of the heat storage material starts to increase again as more thermal energy is provided by the run-down load.

In the case of a solid heat storage material, the temperature of the heat storage material rises as it absorbs heat from the run-down load. The temperature of the heat storage material rises throughout the run down period, although some heat will be dissipated to the ambient by the heat storage material during this phase.

Once run down is complete, no more heat will be provided by the run-down load. The temperature of the heat storage material will stabilise, and the heat stored within it will dissipate to ambient.

The heat storage material may be provided with a heatsink, typically a metal finned heatsink, and/or a cooling fan. The rate of heat dissipation to the ambient will vary depending on the difference in temperature between the heat storage material and the surrounding air; the characteristics of the heat exchanger, if any, and the rate at which air passes over the heat exchange material or the heat sink.

The heat storage material cools towards room temperature. If a phase-change heat storage material is used, the material will remain at its phase change temperature until the material has reverted to its solid state. Once that has happened, the material will continue cooling towards ambient temperature.

This heat storage process accomplishes rapid magnet de-energisation with a smaller and lighter magnet power supply. Service operations, such as shimming, may be performed on the magnet, and the magnet can be ramped back to field while the heat storage material slowly releases the stored energy.

The present invention accordingly provides methods and apparatus for removal of stored energy from superconducting magnets, in which the removed energy is converted to heat, which is stored in a heat storage material for gradual dissipation, rather than being dissipated immediately by a large heat sink, as is conventionally the case.

Although modifications and changes may be suggested by those skilled in the art, it is the intention of the inventor to embody within the patent warranted hereon all changes and modifications as reasonably and properly come within the scope of his contribution to the art.

I claim as my invention:

1. A portable magnet power supply for a superconducting magnet comprising apparatus for the storage of energy released from a superconducting magnet, said apparatus comprising:
   an electrical run-down load for connection across the electrical terminals of the superconducting magnet to receive energy released from the superconducting magnet in a ramping down of the superconducting magnet in a ramping down time span;
   a heat storage material in thermal contact with the run-down load, said heat storage material having a heat storage capacity that stores substantially all of said energy in said ramping down time span; and
   a housing in which said run-down load and said heat storage material are contained, said housing being configured to be manually portable and said run-down load and said heat storage material having a size and weight configured for manual transport of said run-down load and said heat storage material in said housing.

2. Apparatus according to claim 1, wherein the heat storage material undergoes a phase change in response to energy released by the run-down load.

3. Apparatus according to claim 2 wherein the heat storage material comprises paraffin wax.

4. Apparatus according to claim 1 wherein the heat storage material comprises one or more ceramic bricks.

5. Apparatus according to claim 1 wherein the run-down load comprises one or more diodes.

6. Apparatus according to claim 1 wherein the run-down load comprises a resistive element.

7. A method for removing energy from a superconducting magnet using a portable magnet power supply, comprising:
   manually bringing a non-stationary, portable magnet power supply to a site of a superconducting magnet, said portable power supply having a housing containing a run-down load and heat storage material;
   connecting said run-down load of the portable magnet power supply across electrical terminals of the superconducting magnet;
   in a ramping down of said superconducting magnet opening a superconducting switch to divert current flowing in the superconducting magnet through the run-down load, said current having an energy associated therewith and said ramping down procedure taking place in a ramping down time span;

storing substantially all heat generated by the run-down load in response to the current flowing through it during said ramping down time span in the heat storage material of the portable power supply; and allowing the heat storage material to cool after current has ceased to flow through the run-down load.

8. A method according to claim 7 comprising storing heat in the heat storage material by a change in phase of the heat storage material, from solid to liquid; and the heat storage material reverting to a solid state on cooling.

9. A method according to claim 8 comprising employing paraffin wax as the heat storage material.

10. A method according to claim 7 comprising employing a number of ceramic bricks as the heat storage material.

* * * * *